Aug. 5, 1958  L. W. LESSLER ET AL  2,845,836
VIEW FINDER FOR PHOTOGRAPHIC CAMERA
Filed July 12, 1955
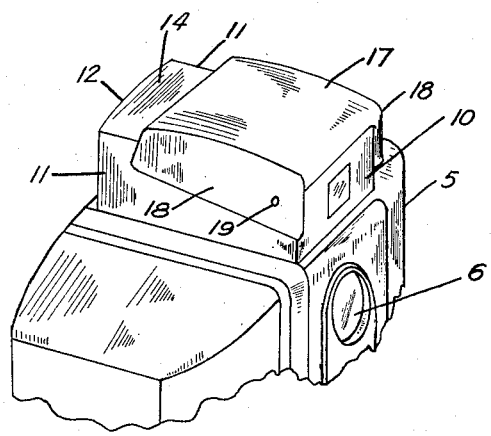
FIG I
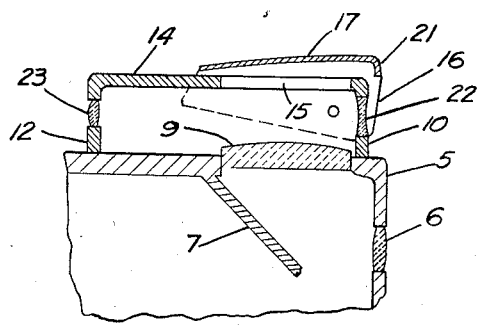
FIG III
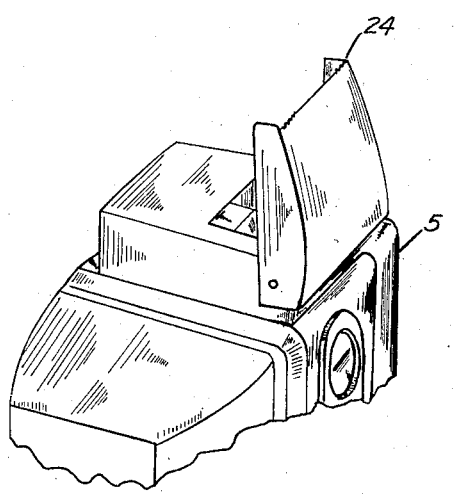
FIG II
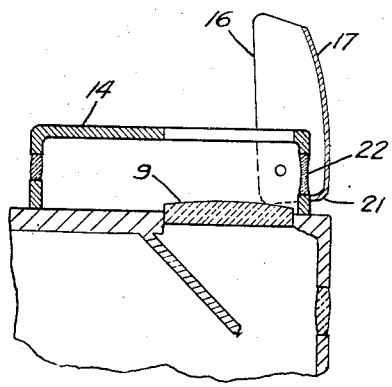
FIG IV
LEW W. LESSLER
JOHN K. POLHEMUS
INVENTORS
BY
ATTORNEYS

United States Patent Office 2,845,836
Patented Aug. 5, 1958

2,845,836

VIEW FINDER FOR PHOTOGRAPHIC CAMERA

Lew W. Lessler, Binghamton, and John K. Polhemus, Endwell, N. Y., assignors to General Aniline & Film Corporation, New York, N. Y., a corporation of Delaware Application July 12, 1955, Serial No. 521,500

1 Claim. (Cl. 88—1.5)

This invention relates to view finders for photographic cameras and more particularly for reflex cameras having a field lens upon which the image of the object is projected.

A particular object of the invention is to provide a view finder which will have a dual function, permitting the user of the camera to view the object either by holding the camera at waist level and looking down, or by holding it at eye level and looking through the finder.

A particular advantage of the invention is that the finder, so constructed, is protected from extraneous light in either viewing position.

It is also a feature of the invention that, whichever viewing position is chosen, the other is automatically made inoperative.

Other objects, features and advantages will be apparent from the following description of the invention, pointed out in particularity in the appended claim and taken in connection with the accompanying drawing, in which:

Fig. 1 is a perspective view of the view finder in closed position attached to the camera, the latter being only partially shown;

Fig. 2 is a view similar to Fig. 1 with the view finder in open position;

Fig. 3 is a cross sectional view, illustrating the operation of the finder in closed or eye level viewing position; and Fig. 4 is a cross sectional view, illustrating the operation of the finder in open or waist level position.

It is often desirable to use a camera in either of two distinct positions, namely, at eye level of the user or at waist level. The advantage of most reflex cameras is well recognized but, at times, it is cumbersome to hold such a camera at waist level, particularly if fast action is desired by the operator. Reflex cameras cannot be operated in eye level position unless means are provided to observe the picture through some viewing accessory other than the normal reflex finder.

Attempts have been made to combine the two types of finders in one structural embodiment, but these invariably have the disadvantage that in neither position is the operation of such finders completely isolated from the other. Moreover, such combined finders generally provide poor light shielding either in the waist level position or in the eye level position. As will be seen from the following description of the figures, the embodiment, in accordance with the invention, completely eliminates these disadvantages.

Referring to the figures, the camera body 5 is provided in the front thereof with a viewing lens 6 which is part of the customary reflex finder used in reflex cameras. This may either be a separate lens in the so-called dual lens reflex camera, which was chosen for illustration, or it may be the main objective lens as used in single reflex cameras.

As seen in Fig. 3 or 4, the viewing lens 6 throws an image of the object upon a mirror 7 supported within the camera at a 45° angle so that the rays reflected are directed upon a field lens or ground glass 9 located in the top portion of the camera body 5. In this manner, the image of the object is projected upon the field lens 9 to be viewed by the user of the camera. Over the field lens 9 and supported on the top portion of the camera body 5 is placed an enclosure comprising front wall 10, side walls 11 and 11', and rear wall 12. A cover 14 completes the enclosure which completely surrounds the field lens 9 and forms thereby an extraneous light shield. The cover 14 has an opening 15 dimensioned to fit over the field lens 9 and permitting the viewing of the object by the user of the camera.

A lid 16 of wedge-shape configuration, having a covering top 17 and sides 18 and 18', is hinged to the side walls 11 and 11' by means of simple stud supports 19 located near the front wall and so placed that when the lid 16 is lifted it takes a position perpendicular to the camera body 5, as seen in Figs. 2 and 4. The covering top 17 of the lid 16 has a rounded, inturned front portion 21, the purpose of which shall be explained later.

The front wall 10 of the enclosure supports a finder lens 22 and the rear wall 12 supports an ocular lens 23 in alignment with the finder lens 22.

Referring to the operation of the combined waist level and eye level view finder, it will be seen in observing Figs. 1 and 3 that when the lid 16 is closed, the top 17 completely covers the opening 15 and excludes any extraneous light. In this position, there is an unimpeded light passage through the finder lens 22 and the ocular lens 23 so that the user of the camera, looking through the latter, will view the object to be photographed. This view is in the eye level position so that the eye level view finder is being utilized. It should be noted that the waist level view finder is now made inoperative by virtue of the closure of the lid 16, the top 17 of which covers the opening 15.

When the lid 16 is lifted, and this is made easier by providing serrations at the folding edge of the top 17, the view finder is ready for waist level observation. The lid 16 now allows viewing of the image projected upon the field lens 9 while, at the same time, the inturned front portion 21 of the lid 16 covers the finder lens 22 so that no extraneous light can enter which would interfere with the viewing of the image on the field lens 9.

Inasmuch as in this position the camera is held against the person using it, the ocular lens 23 is also covered. Thus, the enclosure formed by the walls 10, 11, 11', 12 and the cover 14 forms a hood or light shield surrounding the field lens 9 as is necessary for an efficient reflex view finder. At the flip of a finger the lid 16 may be closed permitting the use of the eye level view finder as described above.

It is to be noted that both finders are completely separated in their particular function, one being made inoperative by the particular position of the lid 16 when the other is used, and vice versa.

We claim:

A combination waist level and eye level view finder for reflex cameras having a substantially hollow body portion with front, back, top, bottom and side walls, a field lens in the top wall of said body, a viewing lens in the front wall of said body and a mirror member positioned within said body to project the image of the object from the viewing lens onto the field lens, comprising an enclosure having front, back and side walls, said enclosure positioned on the top wall of said body and being adapted to surround and enclose said field lens forming an extraneous light shield, said enclosure having a finder lens in the front wall and an ocular lens in the rear wall thereof, a cover for said enclosure having an aperture therein aligned with said field lens for viewing the image on said field lens at waist level, a lid adapted to cover said aperture, means to hinge said lid on the side walls of said enclosure at a point near said front wall, said lid having a rounded portion adapted when in the open waist level position to extend forwardly of said front wall to cover said finder lens and to thereby prevent extraneous light from entering said enclosure through said lens, said lid in said aperture closing position being removed from the front wall of said enclosure, said ocular lens in said back wall of said enclosure and said finder lens in the front wall of said enclosure being in alignment with each other whereby upon closure of said lid, said ocular lens and said finder lens are light shielded by the cover and sides of said enclosure and by said lid to provide an eye level finder for said camera.

References Cited in the file of this patent

UNITED STATES PATENTS 2,285,456  Nowland _____ June 9, 1942